Feb. 22, 1944.    N. C. PRICE    2,342,219
CENTRIFUGAL SUPERCHARGER
Filed March 15, 1940
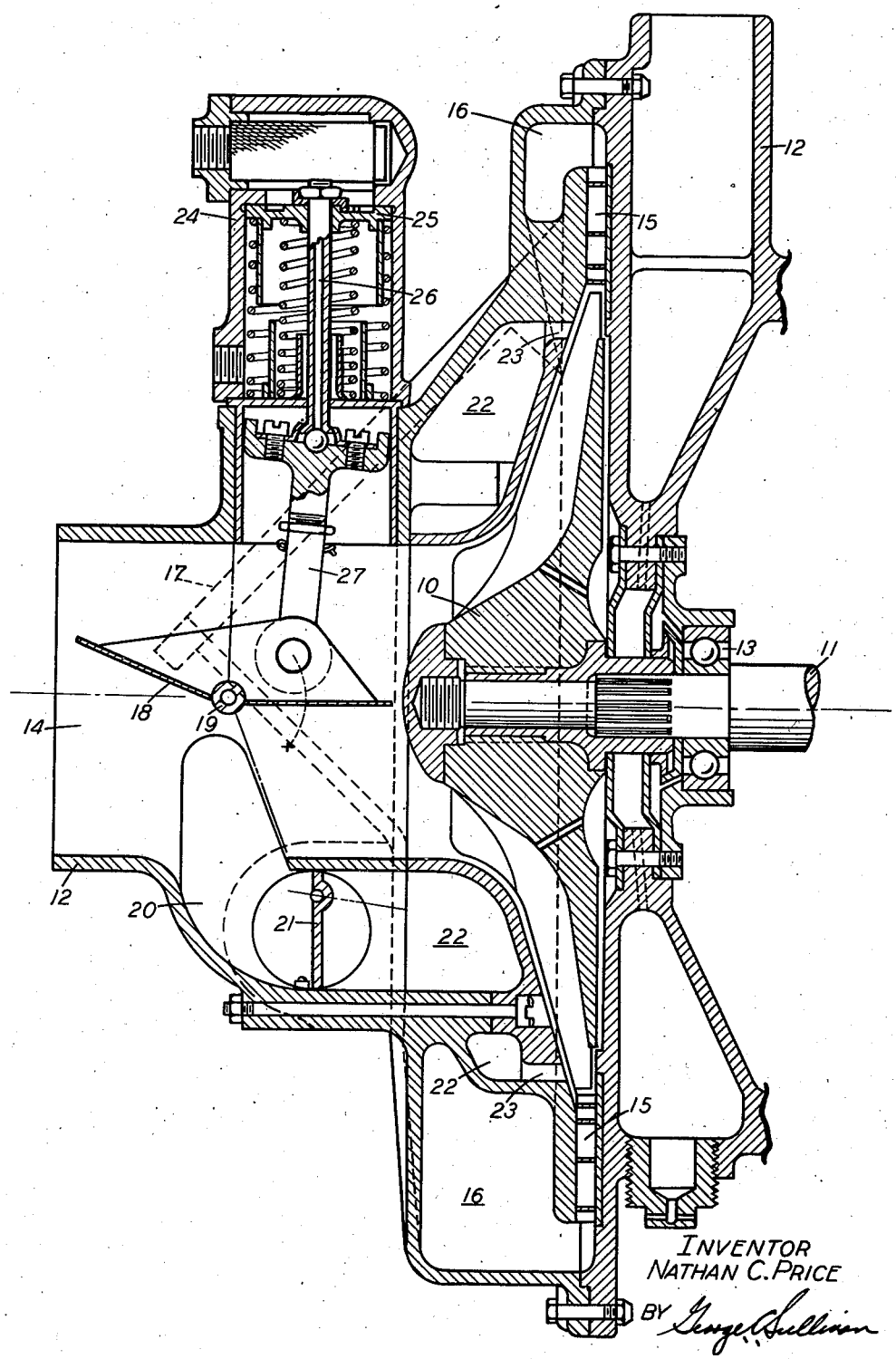
INVENTOR
NATHAN C. PRICE
BY George Sullivan Patented Feb. 22, 1944

2,342,219

UNITED STATES PATENT OFFICE 2,342,219

CENTRIFUGAL SUPERCHARGER

Nathan C. Price, Los Angeles, Calif., assignor to Lockheed Aircraft Corporation, Burbank, Calif.

Application March 15, 1940, Serial No. 324,129

8 Claims. (Cl. 230—114)

This invention relates to centrifugal blowers or superchargers and more specifically to the association therewith of a means disposed in the inlet conduit of the supercharger whereby the quantity and physical properties of the discharge air, gas or other elastic fluid, can be effectively controlled and the range of efficient operation greatly increased.

The provision of a valve in the inlet conduit for the purpose of regulating the quantity of air or gas flowing therein by restricting the effective opening area has heretofore resulted in pulsations and decreased efficiency when the supercharger is operated at reduced output. This inefficiency is primarily due to the fact that the regulating valves employed are of the known butterfly type which operate to throttle the air in a substantially isothermal manner, after which any compression thereof results in an increase in temperature and the expenditure of considerable energy.

In considering the operation of a centrifugal type of supercharger, it will be understood that a velocity head is created in the impeller which is transformed into a pressure head in the diffuser, said transformation being a substantially adiabatic compression in which a considerable rise in temperature takes place. With the conventional type of supercharger having a butterfly type of regulating valve which operates to isothermally throttle the intake air, this elevated temperature exists regardless of the quantity of the air delivered.

For certain applications, such as for air conditioning and pressurizing an aircraft cabin, a supercharger must operate under widely varying conditions and must supply a substantially constant quantity of air at all times; thus, at very low altitudes the cabin pressure would be substantially equal to the atmospheric pressure, and if the supercharger is driven by the propelling engine, the impeller therein would be rotated at high speed, particularly during takeoff and climb, and would expend considerable energy in heating the cabin air.

It is therefore the object of this invention to provide a centrifugal supercharger with an improved means for regulating the quantity and physical properties of the discharge air in which the air or gas entering the supercharger is adiabatically expanded and accelerated and then admitted into the impeller at a speed near that of the impeller at the point of admission. The result is that since the adiabatic expansion process in the supercharger inlet is theoretically the exact reverse of the adiabatic compression in the diffuser, the rise in the temperature and pressure of the discharge air is considerably reduced, while the quantity remains substantially constant. This reduction in the temperature and pressure also results in a corresponding reduction in the energy required to drive the supercharger.

Referring to the drawing which illustrates a sectional view of a centrifugal supercharger embodying my invention, the impeller 10 is secured to the shaft 11 which is rotatably supported in the housing 12 by means of bearings 13. The inlet opening or conduit 14 in the housing 12 allows the air or gas to enter the impeller 10 from which it is discharged at high velocity through the diffuser plate 15 into the annular collector chamber 16. An outlet or discharge opening 17 also disposed in the housing 12 and communicating with the collector chamber 16 is indicated in dotted outline. A butterfly type throttling valve 18 disposed in the inlet conduit 14 so as to pivot with the shaft 19 operates to either restrict or completely close said inlet conduit. A by-pass conduit 20, communicating with the inlet opening 14 is provided with a check valve 21 which allows air to be drawn into the annular chamber 22 from which it is discharged through a plurality of circumferentially disposed nozzles 23 into the impeller 10. In the drawing the nozzles 23 are shown with the axes substantially parallel to the axis of the shaft 11, however, it will be understood that said axes should be directed such that the air discharged therefrom will have a velocity component in the direction of impeller rotation.

Except for the by-pass conduit 20, check valve 21, chamber 22 and nozzles 23, and their functional relation to the operation of the supercharger, the mechanism thus far described is representative of conventional design.

The operation of the supercharger is as follows: During periods when the performance requirements are severe, that is, when the supercharger is delivering maximum quantity under maximum pressure, the throttling valve 18 is in the open position and the static pressure in the impeller 10 opposite the nozzles 23 is great enough to force air backward through the nozzles 23 into the chamber 22 and against the check valve 21. In other words, the supercharger will operate conventionally. However, when it is desired to reduce the quantity and temperature of the discharge air, or to reduce the compression ratio of the supercharger, the inlet throttle valve 18 is rotated to nearly or completely close the inlet opening 14 at which time the static pressure in the impeller 10 opposite the nozzles 23 falls below the pressure in the inlet opening 14 due to the action of the diffuser 15, thus the check valve 21 is automatically opened and air is drawn into the chamber 22 to be adiabatically expanded and accelerated through the nozzles 23 so that it is discharged into the impeller 10 at a speed near that of the impeller at the point of admission. Under this condition the impeller 10 absorbs less power and operates to maintain the decreased pressure back of the nozzles 23.

In the embodiment of the invention shown in the drawing, arrangements have been provided to overcome tendencies for ice formation in the nozzles 23 which, at times, might occur due to the adiabatic expansion of humid air. Accordingly, the chamber 16 has been constructed in direct heat transferring relationship to said nozzles 23 so that same will be warmed sufficiently to prevent the adhesion of ice thereto. However, this warming of the nozzles 23 will not be sufficient to appreciably heat the air. In certain cases where it is not expedient to locate the collector chamber adjacent the nozzles above referred to, other nozzle warming methods, such as heated lubricating oil or heated engine coolant, may be resorted to.

While the inlet throttling valve 18 can be manually operated, it is preferable to provide an automatic means such as an air motor. Accordingly, I have shown an air motor comprised of a cylinder 24 in which there is a double acting spring loaded spherical piston 25 adapted to be displaced by differential pressure and having a solidly attached piston rod 26 and connecting rod 27 connecting same to the inlet throttling valve 18. The differential pressure may be obtained by exposing one end of the piston to the supercharger discharge pressure and the opposite end to the supercharger inlet pressure, or dynamic effects of the discharge air may be derived from a flow measuring venturi (not shown) and in turn transmitted to the piston 25. By means of such automatic controls a substantially constant dynamic flow is maintained regardless of the impeller speed or air density.

Another application for my invention is in connection with supercharged engines, especially in aircraft engines, wherein the variation in altitude results in considerable change in air density. Whenever the engine air throttle is not fully opened, such as during low power cruising at low altitude and during cruising at high altitude with the supercharger running at high speed, there is an unnecessary waste of engine power in driving the supercharger. Since the wasted power is converted into heat in the discharge air, the fuel consumption of the engine is greatly increased due to the fact that the heated air keeps the fuel air mixture far richer than would be required were the air not heated. A considerable improvement in engine economy and in cruising range plus also improvements in engine cooling and reliability as effected by detonation can be accomplished by use of my improved supercharger control which eliminates isothermal throttling of the discharge air.

A suitable form of the control for engine superchargers may include a plurality of variable opening nozzles near the periphery of the impeller, a back-flow check valve back of the nozzles, a second plurality of variable opening nozzles and a second back-flow check valve disposed nearer the center of the impeller, and a shut-off valve in the inlet opening. The outer nozzles would be employed during low-power engine operation at low altitude and would be partly closed as the power was increased. The inner nozzles would come into action at higher altitudes and the outer check valve would be completely closed to prevent back-flow. Accordingly, not only is isothermal throttling of the air avoided but, in effect, a two-stage or multi-stage supercharger is made from a single impeller and diffuser. Over-performance of the supercharger is thereby limited.

Throughout the preceding description reference has been made to adiabatic and isothermal processes, however, it will be understood that such processes exist only in theory, and that certain losses such as turbulence, windage, radiation, etc., act to modify these processes. Therefore, such terminology should be interpreted to mean a substantially isothermal or a substantially adiabatic process and that the use of such terminology in the claims is to be so construed. It will also be understood that my improved compressor control is not necessarily limited to the combination of same with the centrifugal type shown but may be readily adapted to many other types.

Having thus described my invention and the present preferred embodiments thereof, I desire to emphasize the fact that many modifications may be resorted to in a manner limited only by a just interpretation of the following claims.

I claim:

1. In a supercharger of the centrifugal impeller type having an axial inlet and a peripheral outlet, means for throttling said axial inlet, and throttle bypass means terminating in nozzles arranged to discharge into said centrifugal impeller in close proximity to said peripheral outlet whereby the discharge from said nozzles will be blended with the discharge from said impeller, said bypass means having a check valve arranged to prevent backward flow through said bypass when said throttling means reduces the pressure in said impeller.

2. In an elastic fluid compressor of the change of velocity type, a shaft, air impelling vanes joined to said shaft, an induction air inlet communicating with one end of said vanes, a discharge air diffuser communicating with the opposite end of said vanes, variable opening means in said inlet, and air nozzles communicating with said inlet anterior to said variable opening means and with said vanes near the diffuser end thereof and pointed substantially toward said diffuser's entrance.

3. The combination with a supercharger having inlet and outlet conduits a throttled inlet and a centrifugal impeller of a means for regulating the quantity and physical properties of the elastic fluid delivered thereby, comprising a plurality of nozzles supplied from said inlet conduit anterior to said throttle and arranged adjacent to the impeller at locations near to but anterior to the periphery thereof whereby to discharge into a normally positive pressure zone of said impeller under conditions of negative pressure therein, said nozzles having a tangential component relative to the plane of the impeller and being so constructed and arranged as to adiabatically expand the fluid passing therethrough and to deliver the expanded fluid in a direction generally coincident with the direction of motion of said impeller.

4. The combination with a supercharger having inlet and outlet conduits a throttled inlet and a centrifugal impeller of a means for regulating the quantity and physical properties of the elastic fluid delivered thereby, comprising a plurality of nozzles supplied from said inlet conduit anterior to said throttle and arranged adjacent to the impeller at locations near to but anterior to the periphery thereof whereby to discharge into a normally positive pressure zone of said impeller under conditions of negative pressure therein, said nozzles having a tangential component relative to the plane of the impeller and being so constructed and arranged as to adiabatically expand the fluid passing therethrough and to deliver the expanded fluid in a direction generally coincident with the direction of motion of said impeller, and a means for conducting a portion of the fluid discharge such that same is in a heat transferring relationship to said nozzles.

5. The combination with a supercharger having inlet and outlet conduits and a centrifugal impeller of a means for regulating the quantity and physical properties of the air or gas delivered thereby, comprising a valve disposed in the inlet conduit, a by-pass conduit communicating with said inlet conduit at one end at a point anterior to the valve therein and terminating at its other end in a plurality of nozzles arranged alongside the impeller and close to the periphery thereof, said nozzles being so constructed and arranged as to accelerate the flow therethrough into and in a direction to blend with the flow through the impeller.

6. The combination with a supercharger having inlet and outlet conduits and a centrifugal impeller, of a means disposed in the inlet conduit and regulating the quantity and physical properties of the air or gas flowing therein, comprising a throttle valve in said inlet conduit, a by-pass conduit communicating with said inlet conduit at a point anterior to the valve therein, a check valve in said by-pass conduit to prevent back-flow therethrough and a plurality of nozzles leading from said by-pass conduit into said impeller adjacent the periphery thereof whereby to discharge into the impeller in a region having a normally positive pressure under open throttle conditions.

7. In a centrifugal supercharger, the combination of a suitable housing having inlet and outlet conduits communicating therewith, an impeller supported in said housing intermediate said inlet and outlet conduits, a valve disposed in said inlet conduit, a by-pass conduit terminating at one end in said inlet conduit and at its other end in a plurality of circumferentially disposed nozzles adapted to discharge into said impeller adjacent the periphery thereof whereby to discharge into the impeller in a region having a normally positive pressure under open throttle conditions, and a check valve disposed in said by-pass conduit so constructed and arranged as to be closed by the back pressure thereon due to the normally positive pressure at the exit to said nozzles.

8. In a variable discharge elastic fluid centrifugal pump, the combination of an impeller havnig radial passages thereon, a housing for said impeller having inlet and outlet passages in communication with said impeller passages, and means for varying the quantity and physical properties of the fluid discharged, said means including a variable restriction in said inlet passage, a bypass passage therearound, and nozzles connected to said bypass passage and unaffected by said restriction and arranged to discharge into the radial passages of said impeller adjacent to the periphery thereof, whereby to supply inlet air direct to the periphery of the impeller for admixture with the air passing therethrough.

NATHAN C. PRICE.